United States Patent [19]

Kawasaki

[11] Patent Number: 4,786,978
[45] Date of Patent: Nov. 22, 1988

[54] REPRODUCTION APPARATUS

[75] Inventor: Somei Kawasaki, Tokyo, Japan

[73] Assignee: Canon Kabushiki Kaisha, Tokyo, Japan

[21] Appl. No.: 892,585

[22] Filed: Aug. 1, 1986

[30] Foreign Application Priority Data

Aug. 2, 1985 [JP] Japan .................................. 60-170818

[51] Int. Cl.⁴ ......................... H04N 9/87; H04N 5/93
[52] U.S. Cl. .................................... 358/329; 358/328; 358/340
[58] Field of Search ............... 358/310, 327, 328, 329, 358/336, 340, 31, 36; 360/33.1

[56] References Cited

U.S. PATENT DOCUMENTS

| 3,812,523 | 5/1974 | Narahara | 358/329 |
| 3,872,497 | 3/1975 | Amery et al. | 358/329 |
| 4,291,330 | 9/1981 | Hirai | 358/336 |
| 4,613,909 | 9/1986 | Tobe | 358/329 |
| 4,677,487 | 6/1987 | Tomita | 358/336 |
| 4,682,251 | 7/1987 | Hirota et al. | 358/340 |

FOREIGN PATENT DOCUMENTS

| 55-66190 | 5/1980 | Japan | 358/329 |
| 58-117790 | 7/1983 | Japan | 358/329 |
| 2094092 | 9/1982 | United Kingdom | 358/329 |

Primary Examiner—Donald McElheny, Jr.
Attorney, Agent, or Firm—Robin, Blecker & Daley

[57] ABSTRACT

A reproducing apparatus for reproducing a video signal from a recording medium having color signal and luminance signal separated from a composite color television signal recorded thereon, which includes means for applying the reproduced luminance signal to a comb filter in order to remove the color information which leaked into the luminance signal when recording, and means for compensating the deterioration of the reproduced luminance signal resulting from said comb filter.

21 Claims, 4 Drawing Sheets

REPRODUCTION APPARATUS

BACKGROUND OF THE INVENTION

1. Field of the Invention

This invention relates to a picture reproduction apparatus for reproducing video signals recorded on, for example, magnetic sheets.

2. Description of the Related Art

A conventional example of the video signal recording and reproduction apparatus is shown in FIG. 2. Now assuming that a video signal to be recorded has a spectrum shown in FIG. 3, how to record and reproduce it on and from a magnetic sheet by using a magnetic head is explained below.

In FIG. 3, a reference numeral 1 denotes the spectrum of a luminance signal to be recorded with its sink tip at $f_3=6.0$ MHz, and its white peak at $f_4=7.5$ MHz as obtained from a frequency modulator. A reference numeral 2 indicates its spectrum of a color-difference signal to be recorded which includes R-Y signal which is amplitude-modulated at center frequency $f_1=1.2$ MHz and B-Y signal which is amplitude-modulated at center freqnecy $f_2=1.3$ MHz. Here, the R-Y and B-Y signals are processed in sequence for each horizontal period, forming a line-sequential signal.

The process of recording and reproducing an NTSC signal, the video signal, will be explained, with reference to FIG. 2.

The circuit shown in FIG. 2 includes an input terminal 3, a band pass filter 4, a delay circuit 5, subtractors 6 and 7, and a delay circuit 41. The NTSC signal is separated into a color signal and a liminance signal by a "comb filter" constructed of said elements 5, 6, 7 and 41. That is, in order that the deterioration of the vertical resolution for the luminance signal in the comb filter falls within an allowable range, the NTSC signal is made to pass through the band pass filter 4 whose frequency characteristic has its center frequency of $f_C=3.579545$ MHz (the frequency of the NTSC color subcarrier) and then through the delay circuit 5 whose delay time is equal to the horizontal period of the NTSC signal. The output signals of the filter 4 and delay circuit 5 are then applied to the subtractor 6 to remove the luminance signal whose primary component has a frequency equal to integer times the horizontal frequency $f_H$ of the NTSC signal passed through the band pass filter 4. Hence, a color signal is produced from the subtractor 6.

Meanwhile, the NTSC signal from the input terminal 3 is routed to another delay circuit 41 having the same delay time as that of the first delay circuit 5. Its output and the output of the subtractor 6 are then applied to another subtractor 7 to remove the color signal from the NTSC signal. Hence, a luminance signal is produced from the second subtractor 7.

The luminance signal from the subtractor 7 passes a low pass filter 13 and then a pre-emphasis circuit 14 by which the higher frequencies are emphasized with respect to the lower ones. After that, by frequency modulator 15 and a high pass filter 16 is obtained the spectrum of the luminance signal shown by "1" in FIG. 3 which is then applied to an adder 17. Here, the low pass filter 13 has such an output characteristic as, for example, shown in FIG. 5 that the upper sideband is substantially flat at or near the frequency $f_C$ of the NTSC color subcarrier and the cut-off frequency at 3 dB is 4.2 MHz.

The color signal from the subtractor 6 is applied to an NTSC color signal decoder 8 which then produces color difference signals, that is, R-Y and B-Y signals in parallel. Then, by a line-sequential operating and offset adding circuit 9, the R-Y and B-Y signals are serially transferred to form a line-sequential signal, and a DC offset representing which of the R-Y signal and the B-Y signal is then added. Then, the higher region is emphasized by a pre-emphasis circuit 10. By a frequency modulator 11 and a band pass filter 12, it is then changed to a color difference signal to be recorded (see "2" in FIG. 3). In the above-described circuit 9, addition of the offset is controlled in such a manner that the central frequencies of the R-Y and B-Y signals coincide with the aforesaid values of $f_1$ and $f_2$ respectively (see FIG. 3).

The output of the band pass filter 12 is applied to the adder 17 which then produces a video signal to be recorded whose spectrum is shown in FIG. 3.

The output signal of the adder 17 is applied to a recording amplifier 18 of which the output is supplied through a switch 19 to a magnetic head 20.

The magnetic sheet 21 is driven by a motor 22 to rotate in synchronism with the field period of the NTSC signal. As the result, the video signals for one field are recorded in each concentric recording track on the magnetic sheet 21 by the magnetic head 20.

During the time of recording on the magnetic sheet 21, the output signal (luminance signal) of the subtractor 7 is introduced to a vertical synchronizing signal separation circuit 36, so that the vertical synchronizing signal is separated. Also, when the apparatus is switched to the recording mode, a switch 39 is set so that the vertical synchronizing signal is outputted to a terminal 40. The vertical synchronizing signal appearing at the output terminal 40 is used as a reference signal for a servo circuit (not shown) controlling the rotation of the motor 22. Thus, when in the recording mode, the motor 22 is made to rotate in synchronism with the vertical synchronizing signal.

When in the reproduction mode, the video signals recorded on the magnetic sheet 21 are read out by the magnetic head 20 and the readout signals are applied through the switch 19 to a reproducing amplifier 23. The output signal of the reproducing amplifier 23 enters a high pass filter 24 where the color difference signal component is removed from the reproduced signal. After that, the output signal of the high pass filter 24 is applied to a frequency modulator 25 and therefrom further processed through a low pass filter having an almost equal characteristic to that of the low pass filter 13 and a deemphasis circuit 27 to regain the luminance signal.

Meanwhile, the output of the reproducing amplifier 23 is introduced to a band pass filter 28 to remove the recorded luminance signal component. After that, it is applied through a frequency demodulator 29 and a low pass filter 30 to a deemphasis circuit 31. Because the output signals of the deemphasis circuit 30 are line-sequential color-difference signals having offset, the offsets of the R-Y and B-Y signals are removed by a line-coincidence circuit and an offset correction circuit 32. The thus-obtained coincidence signal is then processed for rectangular double-balanced modulation by an NTSC encoder 33. Hence, an NTSC color signal is produced.

The NTSC color signal from the output of the NTSC encoder 33 and the luminance signal from the output of the deemphasis circuit 27 are added by an adder 34 to produce a reproduced NTSC signal at an output terminal 35.

Also, a quartz oscillator 37 produces a clock signal of $f_C = 3.579545$ MHz. This clock signal is applied to the NTSC encoder 33 and is also counted down by a counter 38. So, the counter 38 produces a signal of the same period as that of the vertical synchronising signal.

When a picture is being reproduced, the switch 39 passes the output of the counter 38 to the servo reference signal output terminal 40. Thus, the rotation of the motor 22 is controlled by the signal formed on the basis of the output of the quartz oscillator 37 and having the same period as that of the vertical synchronizing signal.

In such an apparatus, however, the following problem exists. The recording system has a comb filter including the delay circuit 5 and subtractor 6 as shown in FIG. 1 in order to separate the NTSC signal into the luminance signal and the color signal. But, even with the use of such a comb filter, it is difficult to achieve, prevention of some color information from mingling with the luminance signal. In other words, for the reason that the subtraction ratio of the subtractors 6 and 7, the transmission band characteristic of the band pass filter 4, and the discrepancy between the delay characteristics of the delay circuits 5 and 41 vary in manufacture from item to item, the possibility of failure of isolating the luminance signal perfectly from the color signal is not negligible. That part of the color information mingled when in recording produces a beat when in reproduction.

SUMMARY OF THE INVENTION

A first object of the present invention is to eliminate the above-described problem of the prior known apparatus.

A second object is to provide a reproduction apparatus which enables the reproduced picture to be prevented from deteriorating by that part of the color information which is leaked into the luminance signal.

A third object is to provide a reproduction apparatus in which the noise superimposed on the luminance signal is suppressed to improve the signal-to-noise ratio.

A fourth object is to provide a reproduction apparatus of the type in which, while a disc-shaped recording medium being rotated, the video signals are reproduced, whereby despite the rotation of the recording medium is not uniform in speed, the video signals can be reproduced without suffering the otherwise resulting deterioration.

Under such objects, according to a preferred embodiment of the invention there is provided a reproduction apparatus for reproducing video signals from a recording medium on which color and luminance signals as separated from composite television signals were recorded, which includes means for applying the reproduced luminance signal out of the video signal to a comb filter in order to remove the color signal that leaked into the luminance signal when recording, and another means for compensating the deterioration of the luminance signal caused by the comb filter.

Other objects and features of the invention will become apparent from the following description of an embodiment thereof.

DETAILED DESCRIPTION OF THE PREFERRED EMBODIMENT

Firstly, a description will be given of the influence of the color signal which leaks into the luminance signal at the time when the NTSC signal is separated into the luminance and color signals by using the comb filter in the recording mode.

Figure 6A:
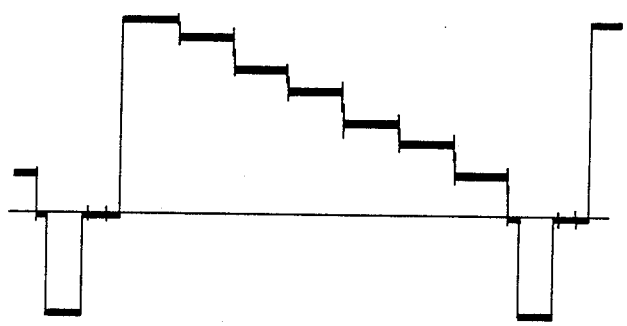
FIGS. 6(A) and 6(B) are waveforms of the luminance signal after passed through the comb filter as seen in oscilloscope.
Figure 6B:

The luminance signal $Y_{REC}$ recorded on the magnetic sheet 21 can, therefore, be regarded as the mixture of the true luminance signal Y and a residual-by-leak of the color signal, $\Delta C$ (see FIG. 6(B)).

$$Y_{REC} = Y + \Delta C \tag{1}$$

Assuming that the reproduction suffers a noise signal denoted by n, then the reproduced luminance signal $Y_{PB}$ can be expressed by the following formula:

$$Y_{PB} = Y + \Delta C + n \tag{2}$$

Hence, letting the reproduced color signal be denoted by $C_{PB}$, the reproduced NTSC signal $S_{PB}$ is specified by the following formula (3):

$$S_{PB} = Y + C_{PB} + \Delta C + n \tag{3}$$

Even if the frequency of oscillation of the quartz oscillator 37 differs by $\Delta f$, since there is correlation between the frequencies of the vertical synchronizing signal and the color subcarrier, and the servo controlling the rotation of the motor 22 is ideal, it becomes possible to bring the frequency of the reproduced color signal $C_{PB}$ and the frequency of the residual-by-leak of the color signal $\Delta C$ into coincidence with each other to establish the synchronism. In such case, the reproduced NTSC signal would be without error.

However, when the motor 22 rotates "at varying speeds at random (jitters)", the frequency of $\Delta C$ is caused vary. Meanwhile, the color signal $C_{PB}$ itself does not vary in frequency, because when in reproduction the demodulated signal by the demodulator 29 after coincidence is treated by the encoder 33 for balanced modulation with the oscillation output of the quartz oscillator 37 as the modulation carrier. Therefore, the above-described beat due to the random variation of the rotation takes place between $C_{PB}$ and $\Delta C$, extremely deteriorating the reproduced picture.

This sort of beat appears particularly in the edge portions of the image, making them conspicuous to the viewer.

That is, in the edge portions of the image across which the color signal changes rapidly, the phase characteristic of the band pass filter 4 is not flat. Even by treating it through the comb filter, therefore, the amount of ΔC leaked in the luminance signal cannot be prevented from increasing.

This will be explained by using FIGS. 6(A) and 6(B). In FIG. 6(A) there is shown the oscilloscopic waveform of the luminance signal obtained at the output of the comb filter. Also, in FIG. 6(B) it is shown in enlarged scale. That is, FIG. 6(A) shows the above-described defect in the form of 75% color bars, and FIG. 6(B) shows, in enlarged scale, that portion of the luminance signal which changes from green to magenta.

It is to be understood from FIG. 6(B) that a very large increase of ΔC results when the luminance signal changes from green to magenta.

Figure 1:
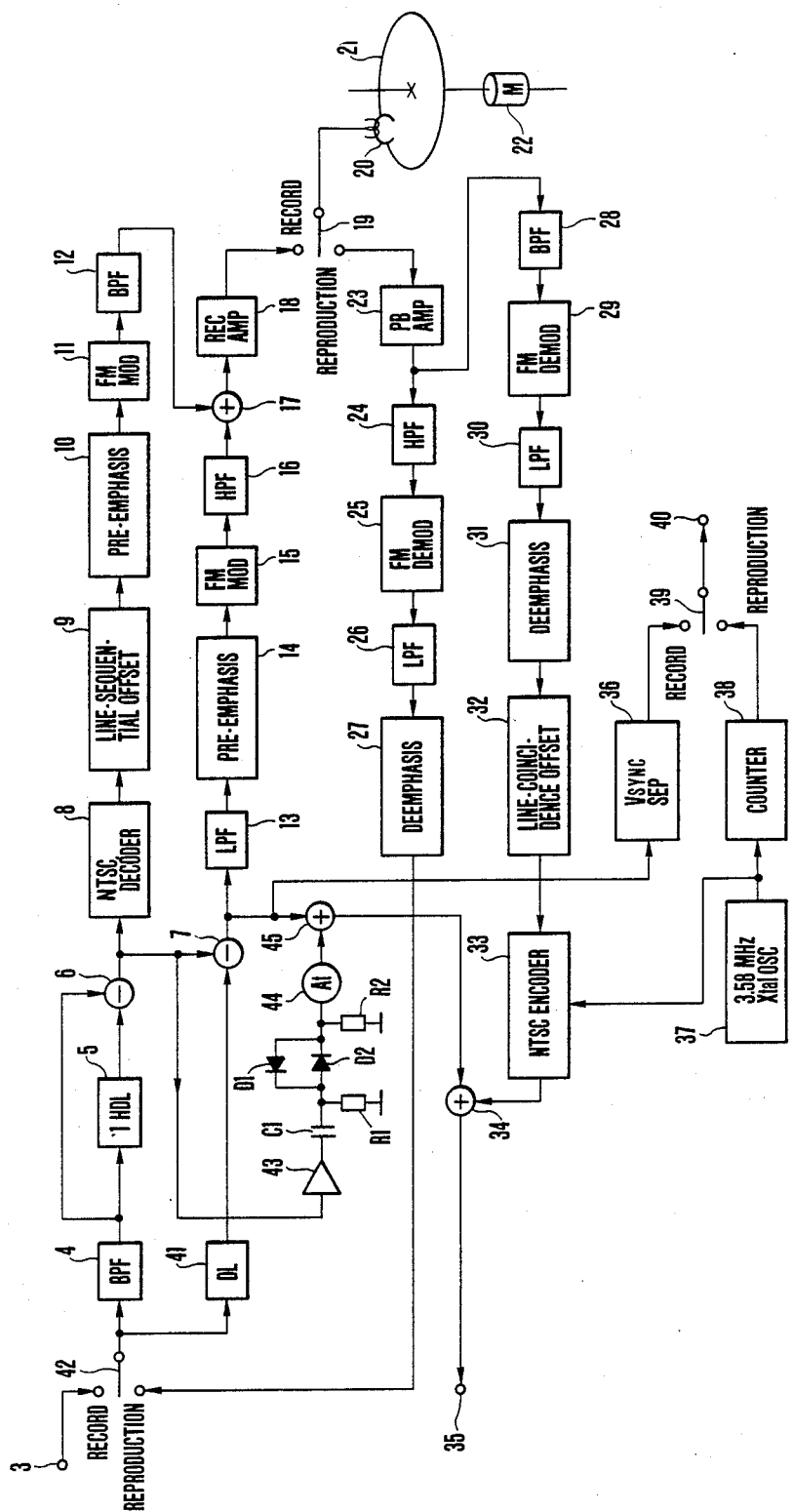
FIG. 1 is a block diagram of an embodiment of the video signal recording and reproducing apparatus according to the present invention.

Next, how to eliminate such a problem is described in connection with an embodiment of the invention by reference to FIG. 1. FIG. 1 shows an example of application of the invention to the video signal recording and reproducing apparatus of FIG. 2. The present invention differs from the prior art of FIG. 2 in that a new loop is formed by a switch 42 to supply the reproduced luminance signal to the comb filter, and that means for compensating the luminance band is added, comprising an amplifier 43, a condenser Cl, diodes Dl and D2, resistors Rl and R2, an attenuator 44 and an adder 45. The other parts are similar to those shown in FIG. 2, being denoted by the same reference numerals.

The switch 42 performs the function of selecting either one of the NTSC signal from the input terminal 3 when in the recording mode and the luminance signal from the deemphasis circuit 27 when in the reproduction mode for application to both the band pass filter 4 and the delay circuit 41. Therefore, the recording mode operates in exactly the same manner as in the prior art of FIG. 2 up to the step of recording the video signals on the magnetic sheet 21.

Figure 2:
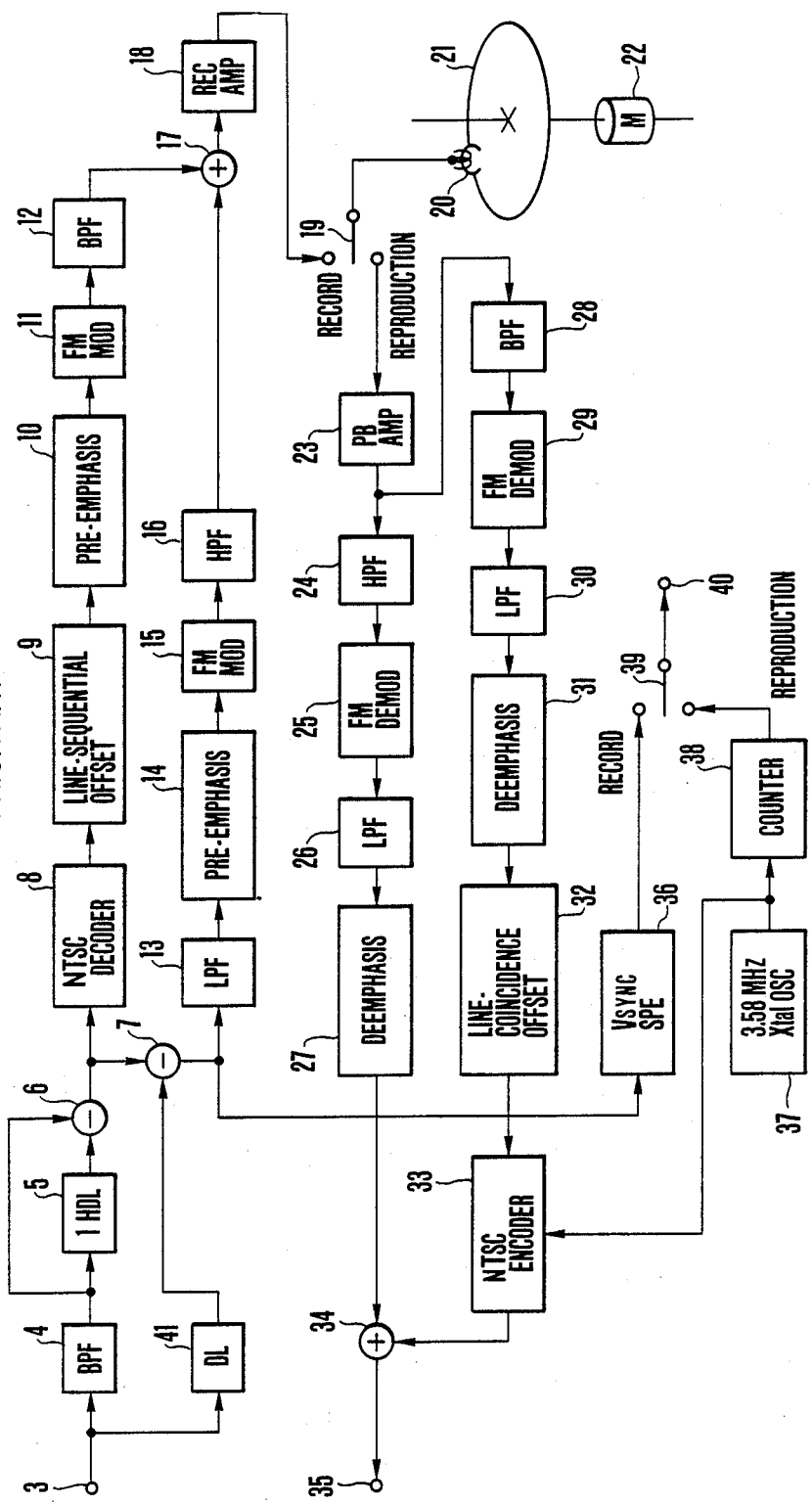
FIG. 2 is a block diagram illustrating an example of the conventional video signal recording and reproducing apparatus.
Figure 3:
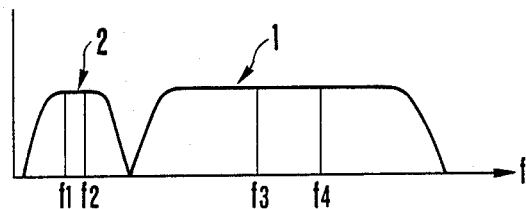
FIG. 3 is a graph of the spectrum of the video signals to be recorded.
Figure 4:
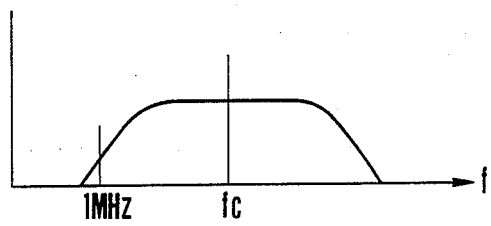
FIG. 4 is a graph illustrating the characteristic of the band pass filter.
Figure 5:
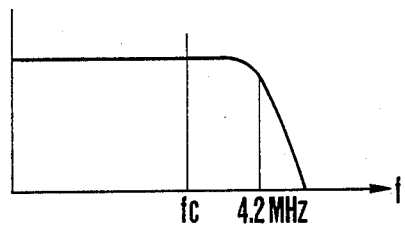
FIG. 5 is a graph illustrating the characteristic of the low pass filter.

Even when in the reproduction mode, similarly to the conventional apparatus of FIG. 2, the reproduced luminance signal $Y_{PB}$ appears at the output of the deemphasis circuit 27, and the reproduced color signal $C_{PB}$ at the output of the NTSC encoder 33. But, the output of the deemphasis circuit 27 is then introduced through the switch 42 to both the band pass filter 4 and the delay circuit 41.

At this time, introduced to the subtractor 6 are the reproduced noise signal having a band of $(n+\frac{1}{2})f_H$ from the "comb filter", and the leak-in signal of the color signal in the luminance signal. Further, the output signal of the subtractor 6 is applied to the amplifier 43 having a proper mu-factor whose output is then supplied through the condenser Cl to the diodes Dl D2.

As the diodes Dl and D2 have a forward voltage $V_D$, the alternating current component of more than $\pm V_D$ only is allowed to arrive at the attenuator 44, while the noise signal $n_1$ of $(n+\frac{1}{2})f_H$ and the leak-in signal ΔC, because their having smaller levels, are blocked. Then, the output of the attenuator 44 is applied to one of the two input terminals of the adder 45. Hence, the output of the attenuator 44 represents the $(n+\frac{1}{2})f_H$ component of the luminance signal. For note, the amplification degree of the amplifier 43 and the attenuation degree of the attenuator 44 are made substantially equalized to each other.

On the other hand, the luminance signal $Y_{PB1}$ that has passed through the "comb filter" is produced from the output of the subtractor 7. The reproduced noise n2 of the luminance signal system having the band of $nf_H$ capable of passing through the "comb filter", the "leakin" $\Delta^2 C$ of the color signal when twice passed through the "comb filter", and the luminance signal Y' of the band of $nf_H$ passed through the comb bilter are related as follows:

$$n = n_1 + n_2 \quad (4)$$

$$\Delta^2 C < < \Delta C \quad (5)$$

$$Y_{PB1} = Y' + \Delta^2 C + n_2 \quad (6)$$

And, the output $Y_{PB2}$ of the attenuator 44 and the luminance signal component y' of the band of $(n+\frac{1}{2})f_H$ produced from the subtractor 6 have the following relationships:

$$Y = Y' + y' \quad (7)$$

$$Y_{PB2} = y' \quad (8)$$

The signal produced from the subtractor 7 is applied to the adder 45 where it is added to the output signal of the attenuator 44 to give $Y'_{PB}$.

Therefore, in final, the reproduced luminance signal expressed by:

$$Y'_{PB} = Y + \Delta^2 C + n_2 \quad (9)$$

is obtained.

As is obvious from the above-described equations (6) and (9) even if the adjustment of the "comb filter" is somewhat inaccurate, the value of "$\Delta^2 C$" will be far smaller than the noise signal, and, because the characteristic of the band pass filter determines the majority of the band of the luminance signal, the new noise signal $n_2$ will be lower in level than the original noise signal, n, by 3 dB or thereabout. As a result, an improvement of the S/N of the reproduced luminance signal is attained. Moreover, because the decrease of the $(n+\frac{1}{2})f_H$ component of the luminance signal resulting from the passage of the reproduced luminance signal through the comb filter is compensated in the addition by the adder 45, the luminance band, too, is sufficient.

It is to be noted that the comb filter through which the reproduced luminance signal passes is, in the illustrated embodiment, made common with the comb filter for separation of the color and luminance signal when in the recording mode, with an advantage that the characteristics are easy to coincide, and the construction is simplified. In stead of this, it is, needless to say, possible to realize it by another comb filter solely used in the reproduction system. Also, the form of the luminance band compensation means is not confined to that of the illustrated embodiment.

As has been described above, according to the present invention the unnecessary noise signal included in the reproduced luminance signal and the leak-in of the color signal into the luminance signal which is caused to occur by the characteristic the comb filter used in the recording has can be lessened remarkably without causing deterioration of the luminance signal necessary as a rule. Therefore, an advantage is produced that the S/N ratio of the reproduced luminance signal can be improved. Another advantage is that a picture reproduction apparatus which has achieved an extreme reduction of the beat phenomenon of color that is very uncomfortable for viewing can be realized.

Further, according to the present invention, an additional advantage is even obtained in that the design of the servo motor for rotating the magnetic sheet or the like which has heretofore been very difficult to do becomes easy, and the tolerances on the characteristics of the comb filter for separating the luminance and color signals from each other and the accuracy of their adjustment ca be made gentler.

What is claimed is:

1. A reproducing apparatus for reproducing a luminance signal recorded on a recording medium with with improved signal-to-noise ratio, including:
   (a) reproducing means for reproducing the luminance signal recorded on said recording medium;
   (b) separating means for separating such reproduced luminance signal into a first signal including a prescribed rate of noise component and into a second signal including a smaller rate of noise component than that of said first signal;
   (c) removing means for removing said noise component of said first signal to thereby produce a third signal; and
   (d) adder means for adding said third signal to said second signal to produce an apparatus output signal.

2. A reproducing apparatus according to claim 1, wherein each said noise component is a color signal leaked into the luminance signal recorded on said recording medium and present in said reproduced luminance signal.

3. A reproducing apparatus according to claim 1, wherein said removing means includes circuit means for attenuating said first signal.

4. A reproducing apparatus according to claim 1, wherein said separation means is a comb filter.

5. A reproducing apparatus according to claim 1, wherein said reproducing means also reproduces a color signal recorded on said recording medium.

6. A reproducing apparatus according to claim 5, further comprising:
   means for making a composite video signal inclusive of said adder means output signal and saids color signal.

7. A reproducing apparatus according to claim 6, wherein said composite video signal-making menas includes means for modulating said color signal.

8. A recording and reproducing apparatus comprising:
   (a) a comb filter for separating an incoming video signal into a luminance signal and a color signal;
   (b) recording means for receiving the separated luminance signal and the separated color signal on a recording medium;
   (c) means for reproducing separately from the signals recorded on said meidum the recorded luminance signal and the recorded color signal; and
   (d) means for applying such separated reproduced luminance signal to said comb filter and for processing such filtered reproduced luminance signal for reducing color signal content therein.

9. A recording and reproducing apparatus according to claim 8, wherein said recording means includes:
   (a) first modulation means for receiving said separated reproduced luminance signal
   (b) second modulation means for receiving said separated reproduced color signal; and
   (c) a head for recording the modulated signals on said medium.

10. A recording and reproducing apparatus according to claim 8, further comprising:
    means for producing a composite video signal from said separated reproduced color signal and said separated reproduced luminance signal provided from said comb filter.

11. A recording and reproducing apparatus according to claim 8, wherien said means is further operative for removing noise from said separated reproduced luminance signal.

12. A recording and reproducing apparatus according to claim 11, wherein said combo filter includes
    (a) delay means for delaying said incoming video signal for one horizontal period;
    (b) subtractor means for subtracting such delayed video signal from said incoming video signal.

13. A recording and reproducing apparatus according to claim 11 wherein said medium is a disc-shaped magnetic sheet.

14. In a recording and reproducing apparatus, a signal processing device for the recording and reproducing of an incoming color video signal, comprising:
    (a) separation means for receving said video signal and for separating therefrom its luminance signal and its color signal, including delay means having a delay time time equal to one horizontal period of said video signal;
    (b) recording means for receiving such separated color signal and such separated luminance signal, for modulating such received signals and for recording such modulated signals on a recording meidum;
    (c) reproducing means for reproducing such recorded signals including said luminance signal and said color signal from said medium; and
    (d) means for applying said reproduced luminance signal to said separation means, whereby said delay means operates thereon, and for processing such delayed reproduced luminance signal for reducing color signal content in siad reproduced luminance signal.

15. A recording and reproducing apparatus according to claim 14, wherein said separation means includes:
    (a) means for supplying said incoming video signal to said delay means to provide a delayed video signal; and
    (b) means for subtracting the delayed video signal from the incoming video signal.

16. A recording and reproducing apparatus according to claim 14, wherein said means (d) includes means for compensating deterioration of the band of the luminance signal as effected by said separation means.

17. A recording and reproducing apparatus according to claim 14, wherein said delay means constitutes a comb filter.

18. A recording and reproducing apparatus according to claim 14, wherein said recording means includes:
    (a) first modulation means for modulating the separated color signal;
    (b) second modulation means for modulating the separated luminance signal; and
    (c) a head for recording the modulated signals on said medium.

19. A recording and reproducing apparatus according to claim 18, wherein said reproducing means employs said head for performing reproduction.

20. A recording and reproducing apparatus according to claim 14, including a further separation means for receiving and demodulating the signals reproduced by said reproducing means and separating the luminance signal and the color signal therefrom.

21. A recording and reproducing apparatus according to claim 20, wherein said further separation means includes:
(a) first demodulating means for providing said reproduced color signal; and
(b) second demodulating means for providing said reproduced luminance signal.

* * * * *